(12) United States Patent
Hwang et al.

(10) Patent No.: US 12,123,822 B2
(45) Date of Patent: Oct. 22, 2024

(54) IMAGING SYSTEM

(71) Applicant: DAEGU GYEONGBUK INSTITUTE OF SCIENCE AND TECHNOLOGY, Daegu (KR)

(72) Inventors: Jae Youn Hwang, Daegu (KR); Sang Yeon Youn, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 192 days.

(21) Appl. No.: 18/013,965

(22) PCT Filed: Jul. 5, 2021

(86) PCT No.: PCT/KR2021/008481
§ 371 (c)(1),
(2) Date: Dec. 30, 2022

(87) PCT Pub. No.: WO2022/010200
PCT Pub. Date: Jan. 13, 2022

(65) Prior Publication Data
US 2023/0288310 A1     Sep. 14, 2023

(30) Foreign Application Priority Data
Jul. 8, 2020   (KR) ........................ 10-2020-0083920

(51) Int. Cl.
*G01N 15/14*     (2024.01)
*G01B 11/06*     (2006.01)
(Continued)

(52) U.S. Cl.
CPC ......... *G01N 15/1434* (2013.01); *G01B 11/06* (2013.01); *G06T 7/60* (2013.01);
(Continued)

(58) Field of Classification Search
CPC .............. G01N 15/1434; G01N 15/01; G01N 2015/1006; G01N 2015/144;
(Continued)

(56) References Cited

U.S. PATENT DOCUMENTS

2006/0173309 A1 *   8/2006   Suzuki ................. A61B 8/5238
                                                 600/437

FOREIGN PATENT DOCUMENTS

KR    20010067091    7/2001
KR    20090103408    10/2009

OTHER PUBLICATIONS

Jae Youn Hwang et al., "Acoustic tweezers for studying intracellular calcium signaling in SKBR-3 human breast cancer cells," Ultrasonics, vol. 63, pp. 94-101, Dec. 2015, doi: 10.1016/j.ultras.2015.06.017., Jun. 26, 2015.

(Continued)

*Primary Examiner* — Jamil Ahmed
(74) *Attorney, Agent, or Firm* — LEX IP MEISTER, PLLC

(57) ABSTRACT

An imaging system according to an embodiment may include an ultrasonic oscillation part configured to apply ultrasonic waves to a sample, an image acquisition part configured to acquire a plurality of images of the sample deformed by the ultrasonic waves, and a computation part configured to compute a deformation rate on the basis of a change in thickness of the sample from the plurality of images, in which the computation part computes an elastic modulus of the sample on the basis of intensity of the ultrasonic waves and the deformation rate of the sample.

15 Claims, 9 Drawing Sheets

(51) Int. Cl.
  *G01N 15/1434* (2024.01)
  *G06T 7/60* (2017.01)
  *H04N 23/56* (2023.01)
  *G01N 15/01* (2024.01)
  *G01N 15/10* (2006.01)

(52) U.S. Cl.
  CPC ............ *H04N 23/56* (2023.01); *G01N 15/01* (2024.01); *G01N 2015/1006* (2013.01); *G01N 2015/144* (2013.01); *G01N 2015/1495* (2013.01); *G06T 2207/10056* (2013.01); *G06T 2207/30024* (2013.01); *G06T 2207/30096* (2013.01)

(58) Field of Classification Search
  CPC ........... G01N 2015/1495; H04N 23/56; G01B 11/06; G06T 7/60; G06T 2207/10056; G06T 2207/30024; G06T 2207/30096
  See application file for complete search history.

(56) References Cited

OTHER PUBLICATIONS

Jae Youn Hwang et al., "Cell Deformation by Single-beam Acoustic Trapping: A Promising Tool for Measurements of Cell Mechanics," Scientific Reports, vol. 6, Jun. 2016, doi: 10.1038/srep27238, Jun. 8, 2016.

Małgorzata Lekka, "A tip for diagnosing cancer", Nature Nanotechnology, vol. 7, Nov. 2012.

* cited by examiner

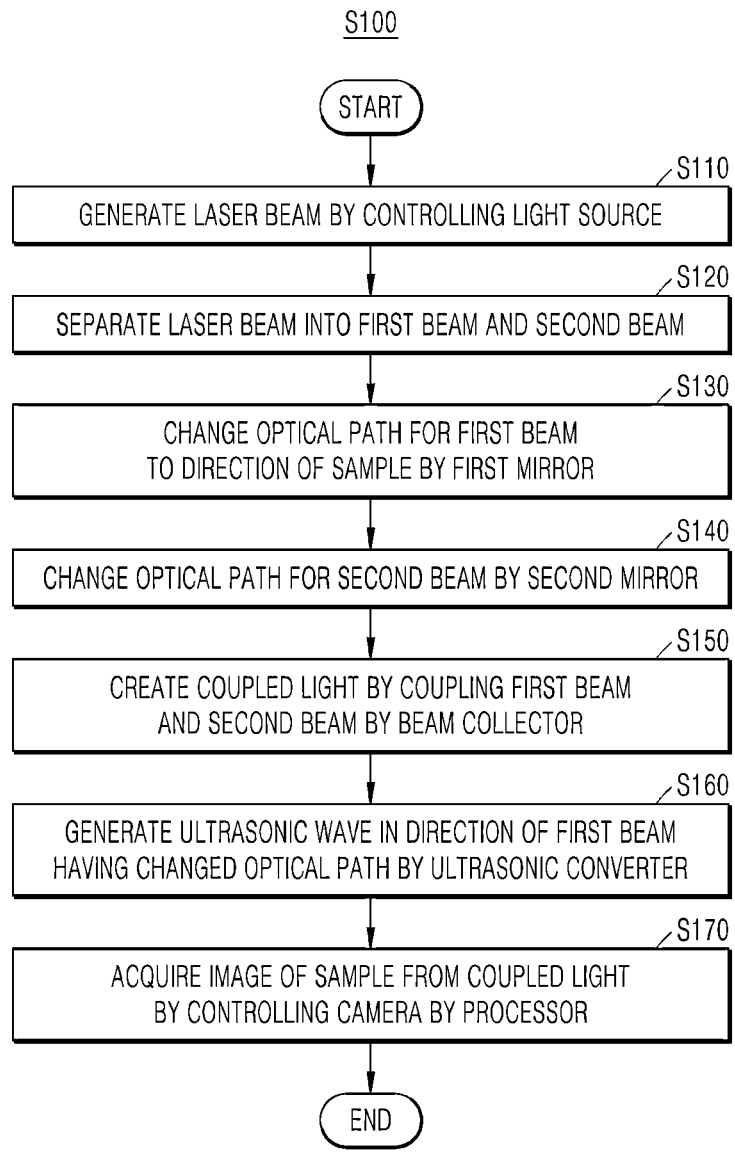

IMAGING SYSTEM

CROSS-REFERENCE TO RELATED APPLICATION

This present application claims the benefit of priority to Korean Patent Application No. 10-2020-0083920, entitled "IMAGING SYSTEM," filed on Jul. 8, 2020, in the Korean Intellectual Property Office, the entire disclosure of which is incorporated herein by reference.

FIELD

Disclosed is an imaging system. Specifically, an imaging system capable of measuring characteristics of cells in a contactless manner by using ultrasonic stimulation and ultra-high-speed optical phase imaging is disclosed.

BACKGROUND

Cancer metastasis is one of the phenomena caused by the progression of cancer. The cancer metastasis occurs through processes such as the movement of a cancer cell to other organs from a primary focus, the implantation and proliferation of the cancer cell, and the formation of tumor tissue. In this case, the cancer cell invades other organs while moving in the body through the blood vessels. In order for the cancer cell to enter a narrow anatomical space, the cancer cell needs to have higher elasticity than normal cells. In other words, it can be said that the higher the elasticity of the cancer cell, the higher the metastasis.

Recently, with the development of studies on the metastasis of the cancer cell, a change in physical attributes of tissue cells, particularly, a change in elasticity is considered to be a sign for determining whether the cancer occurs. Many researchers have reported study results indicating that the stiffness of the metastasizing cancer cell decreases. In this regard, there has been developed a nano-technology for distinguishing a metastatic cancer cell and a normal cell by measuring a degree of softness of the cell.

The above-mentioned background art is technical information that the inventors have retained to derive the present disclosure or have obtained in the course of deriving the present disclosure, and cannot be thus said to be technical information publicly known to the public before filing the present application.

SUMMARY

An object according to an embodiment is to provide a system for precisely measuring mechanical characteristics of cells by using ultrasonic radiation and optical phase imaging.

Another object according to the embodiment is to provide a system for measuring mechanical characteristics of cells in a non-invasive and non-destructive manner.

Still another object according to the embodiment is to provide a system for measuring mechanical characteristics of cells without cell culture.

Yet another object according to the embodiment is to provide a system for acquiring information on deformation in X-axis, Y-axis, and Z-axis directions of cells.

Still yet another object according to the embodiment is to provide a system for acquiring high-resolution cell images.

Technical problems to be solved by the embodiments are not limited to the aforementioned technical problem, and other technical problems, which are not mentioned above, may be clearly understood by those skilled in the art from the following descriptions.

An aspect of the present disclosure is to provide an imaging system including: an ultrasonic oscillation part configured to apply ultrasonic waves to a sample; an image acquisition part configured to acquire a plurality of images of the sample deformed by the ultrasonic waves; and a computation part configured to compute a deformation rate on the basis of a change in thickness of the sample from the plurality of images, in which the computation part computes an elastic modulus of the sample on the basis of intensity of the ultrasonic waves and the deformation rate of the sample.

According to the aspect, the ultrasonic oscillation part may include: an ultrasonic converter configured to convert an electrical signal into the ultrasonic waves; a function generator configured to apply an electrical signal to the ultrasonic converter; an electric power amplifier configured to amplify a low-voltage signal to a high-voltage signal; and a three-axis motorized stage configured to finely adjust a position of the ultrasonic converter and a position of the electric power amplifier, and the ultrasonic converter may apply the ultrasonic waves to the sample in an axial direction identical to a direction of a light source of the image acquisition part.

According to the aspect, the ultrasonic converter may be formed in a ring type to ensure a propagation path of the light source.

According to the aspect, intensity of the ultrasonic waves emitted from the ultrasonic converter may be controlled by the electric power amplifier.

According to the aspect, the ultrasonic converter may be a high-frequency converter, and when the ultrasonic converter applies the ultrasonic waves to the sample, the sample floating in a culture medium may be moved toward a focal point of the ultrasonic waves.

According to the aspect, the ultrasonic oscillation part may emit high-frequency ultrasonic micro-beams to a single sample and emit low-frequency ultrasonic beams to a plurality of samples to measure mechanical characteristics of the sample.

According to the aspect, the image acquisition part may include: a light source configured to emit light to the sample; a phase difference microscope configured to create a phase difference image of the sample; and a camera configured to acquire a plurality of phase difference images by capturing images of the sample that is deformed by the ultrasonic waves and restored again.

According to the aspect, the camera may be an ultra-high-speed camera configured to acquire the image of the sample at a speed of 1000 fps or more.

According to the aspect, the computation part may measure a thickness displacement of the sample by analyzing the plurality of phase difference images for each pixel and compute the deformation rate of the sample.

According to the aspect, the computation part may compute the elastic modulus of the sample on the basis of the intensity of the ultrasonic waves and the deformation rate.

According to the imaging system according to the embodiment, it is possible to precisely measure mechanical characteristics of cells by using ultrasonic radiation and optical phase imaging.

According to the imaging system according to the embodiment, it is possible to measure mechanical characteristics of cells in a non-invasive and non-destructive manner.

According to the imaging system according to the embodiment, it is possible to measure mechanical characteristics of cells without cell culture.

According to the imaging system according to the embodiment, it is possible to acquire information on deformation in X-axis, Y-axis, and Z-axis directions of cells.

According to the imaging system according to the embodiment, it is possible to acquire high-resolution cell images.

The effects of the imaging system according to the embodiment are not limited to the aforementioned effects, and other effects, which are not mentioned above, may be clearly understood by those skilled in the art from the following descriptions.

BRIEF DESCRIPTION OF THE DRAWINGS

The above and other aspects, features, and advantages of the present disclosure will become apparent from the detailed description of the following aspects in conjunction with the accompanying drawings, in which:

FIG. 10 is a flowchart illustrating a method of controlling an imaging system.

DETAILED DESCRIPTION

Figure 1:
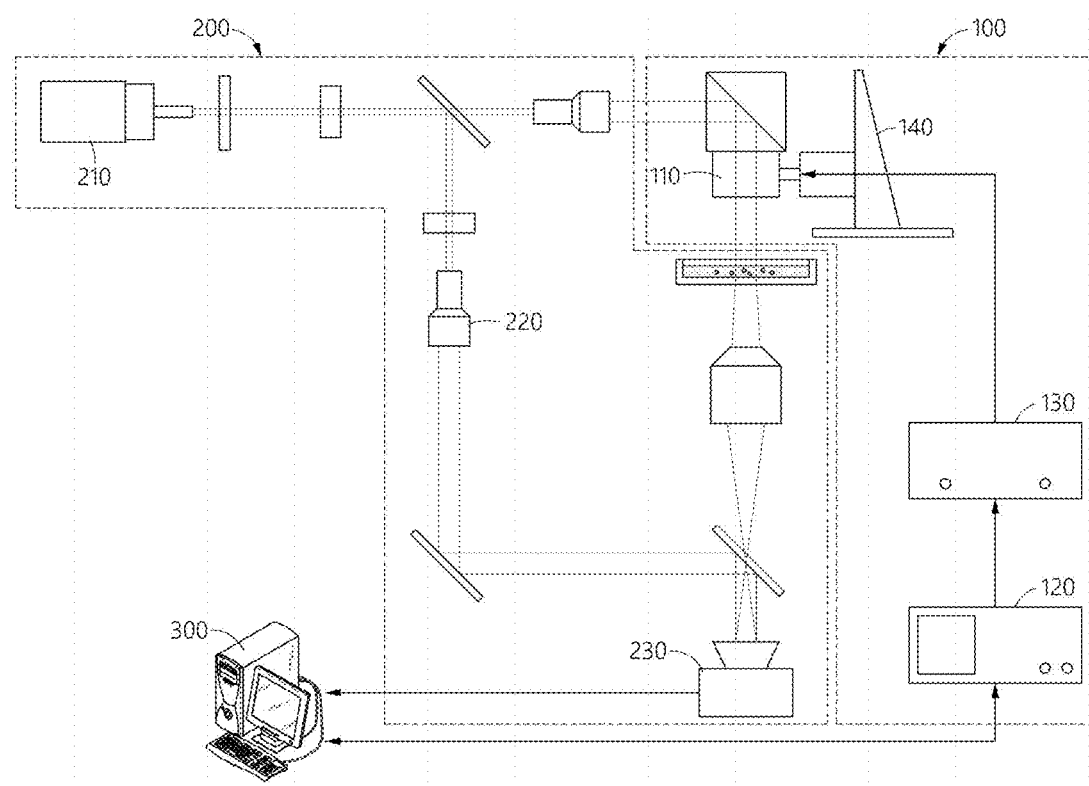
FIG. 1 is a schematic view of an imaging system according to an embodiment.

Hereinafter, embodiments will be described in detail with reference to the accompanying drawings. However, the embodiments may be variously changed, and the protection scope of the patent application is not restricted or limited by the embodiments. It should be understood that all alterations, equivalents, and alternatives of the embodiments are included in the protection scope.

The terminologies used in the embodiments are used for the purpose of describing the embodiments only, and it should not be interpreted that the terminologies are intended to limit the embodiments. Singular expressions include plural expressions unless clearly described as different meanings in the context. In the present specification, the terms "comprises," "comprising," "includes," "including," "containing," "has," "having" or other variations thereof are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms used herein, including technical or scientific terms, have the same meaning as commonly understood by those skilled in the art to which the embodiments pertain. The terms such as those defined in a commonly used dictionary should be interpreted as having meanings consistent with meanings in the context of related technologies and should not be interpreted as ideal or excessively formal meanings unless explicitly defined in the present application.

In addition, in the description of the exemplary embodiments with reference to the accompanying drawings, the same constituent elements will be designated by the same reference numerals regardless of reference numerals, and a duplicated description thereof will be omitted. In the description of the embodiment, the specific descriptions of publicly known related technologies will be omitted when it is determined that the specific descriptions may unnecessarily obscure the subject matter of the embodiment.

In addition, the terms first, second, A, B, (a), and (b) may be used to describe constituent elements of the embodiments. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other embodiments. Unless disclosed to the contrary, the configuration disclosed in any one embodiment may be applied to other embodiments, and the specific description of the repeated configuration will be omitted.

FIG. 1 is a schematic view of an imaging system 10 according to an embodiment.

Referring to FIG. 1, the imaging system 10 according to the embodiment may include an ultrasonic oscillation part 100, an image acquisition part 200, and a computation part 300.

Specifically, the ultrasonic oscillation part 100 may apply ultrasonic waves to a sample C.

The image acquisition part 200 may acquire a plurality of images of the sample C deformed by the ultrasonic waves.

In the embodiment, the computation part 300 may compute a deformation rate according to a change in thickness of the sample C from the plurality of images. The computation part 300 may be a computing device or a part of the computing device including a processor, a memory, a non-transitory storage medium, and the like. The computing device may be a general-purpose computing device for a personal computer (PC), a lap-top computer, a tablet computer, and a server device or a special-purpose computing device for controlling the image acquisition part 200 and the ultrasonic oscillation part 100.

In another embodiment, the computation part 300 may transmit a plurality of images acquired before ultrasonic oscillation, during ultrasonic oscillation, and after ultrasonic oscillation or a phase difference image created from the plurality of images to an external device. The external device may compute the deformation rate according to the change in thickness of the sample C on the basis of the plurality of images or the phase difference image.

The computation part 300 may be configured as a processor or a combination of a processor and a memory. The processor may include all the types of devices capable of processing data, e.g., a CPU, an MCU, aGPU, and an AI accelerator chip. Here, the 'processor' may refer to a data processing device embedded in hardware and having, for example, a circuit physically structured to perform a function represented by codes or instructions included in a program.

Examples of the data processing device embedded in hardware may include processing devices such as a microprocessor, a central processing unit (CPU), a processor core, a multi-processor multiprocessor, an application-specific integrated circuit (ASIC), or a field programmable gate array (FPGA), but the scope of the present disclosure is not limited thereto.

The computation part 300 may store instructions for controlling the image acquisition part 200 and the ultrasonic oscillation part 100 in the memory. The memory may include one or more temporary or non-transitory storage media such as a RAM, a ROM, an EEPROM, an EPROM, flash memory devices, and magnetic discs.

The imaging system 10 according to the embodiment may quantitatively measure mechanical characteristics of the sample C on the basis of intensity of ultrasonic waves emitted from the ultrasonic oscillation part 100 and the deformation rate of the sample C computed by the computation part 300 from the image acquired by the image acquisition part 200.

In this case, for example, the sample C used for the imaging system 10 according to the embodiment may be a cancer cell. It has been generally known that the higher the metastasis of the cancer cell, the higher the elasticity.

As a result, the imaging system 10 according to the embodiment may determine the metastasis of the cancer cell by measuring mechanical characteristics, i.e., an elastic modulus of the sample C.

Referring back to FIG. 1, the ultrasonic oscillation part 100 may include an ultrasonic converter 110, a function generator 120, an electric power amplifier 130, and a three-axis motorized stage 140.

Specifically, the ultrasonic converter 110 may convert an electrical signal into ultrasonic waves and emit the ultrasonic waves toward the sample C.

In this case, the ultrasonic converter 110 may be provided to apply the ultrasonic waves in an axial direction identical to a light emission direction of a light source 210 of the image acquisition part 200 to the sample C. For example, when a plane on which the sample C is placed is an X-Y plane, the emission direction of the ultrasonic waves to the sample C and the light emission direction of the light source may be a Z-axis direction.

In addition, the ultrasonic converter 110 may be formed in a ring type and ensure a propagation path of the light source 210.

The function generator 120 may apply an electrical signal to the ultrasonic converter 110.

The electric power amplifier 130 may amplify a low-voltage signal to a high-voltage signal. The electric power amplifier 130 may control the intensity of the ultrasonic waves emitted from the ultrasonic converter 110. That is, direct pressure applied to the sample C by the ultrasonic waves may be adjusted.

The three-axis motorized stage 140 may finely adjust the positions of the ultrasonic converter 110 and the electric power amplifier.

The image acquisition part 200 may include the light source 210, a phase difference microscope, and a camera 230.

The light source 210 may emit light to the sample C. For example, the light source 210 may emit laser beams.

In addition, the light emitted from the light source 210 may be emitted to the sample C through the ring-type ultrasonic converter 110.

The phase difference microscope changes a phase difference of the light passing through the sample C from the light source 210 into contrast, thereby allowing the transparent sample C to be observed. The phase difference microscope may acquire a high-resolution image of a single cell deformed by the ultrasonic waves. In addition, it is possible to accurately measure a thickness of the sample C by measuring a phase difference of the transmitted light.

In the embodiment, the phase difference microscope may be a quantitative phase digital holographic microscope (QP-DHM).

In case that the phase difference microscope is a quantitative phase digital holographic microscope, the coherent light may be split into an object wave and a reference wave by using a beam splitter having a small inclination angle between two beams. The object wave may illuminate a specimen (sample) and create an object wave front. A microscope objective lens MO enlarges the object wave front, and the object and reference wave fronts are coupled by the beam collector at an outlet of an interferometer, thereby creating a hologram. The created hologram may be transmitted to the computation part 300 configured to control the digital holographic microscope. The digital holographic microscope or the computation part 300 may remove undesired signals by performing filtering processing in a frequency domain of the hologram.

The computing device for controlling the digital holographic microscope or the digital holographic microscope may illuminate the hologram filtered by using a copy of the reference wave and reconstruct the hologram by Fresnel approximation.

When plane waves propagate toward the object (sample), such as a cell, and then pass through the cell, output waves, which have different phases according to a thickness or refractive index of the object such as a cell, are outputted, and an image having, as a pixel value, the amount of change in phase of the output waves with respect to phases of the inputted plane waves may be referred to as a phase image.

The camera 230 may capture an image of the sample C observed by the phase difference microscope when the sample C is deformed by the ultrasonic waves and then restored. For example, the camera may be an ultra-high-speed camera configured to acquire an image of the sample C at a speed of 1000 fps or more.

The image acquisition part 200 configured as described above may also measure elasticity of a local site in the cell and acquire a high-magnification X-Y plane image.

The computation part 300 may measure a displacement of the sample C in the Z-axis direction, i.e., a change in thickness for each pixel from a plurality of phase difference images acquired by the image acquisition part 200. Therefore, the computation part 300 may compute the deformation rates made before, during, and after the application of the ultrasonic waves to the sample C. As a result, the computation part 300 may compute the elastic modulus of the sample C on the basis of the intensity of the ultrasonic stimulation and the deformation rate of the sample C.

The image acquisition part 200 may not only acquire the plurality of X-Y plane images of the sample C made before, during, and after the application of the ultrasonic stimulation, in the form of short impulse, to the sample C from the ultrasonic converter 110, but also acquire the change in thickness of the sample C in the Z-axis direction, i.e., information on the displacement, such that the computation part 300 may map the elasticity of the local site of the sample C by computing the time for which the sample C is restored to an original thickness after stimulation.

Figure 2:
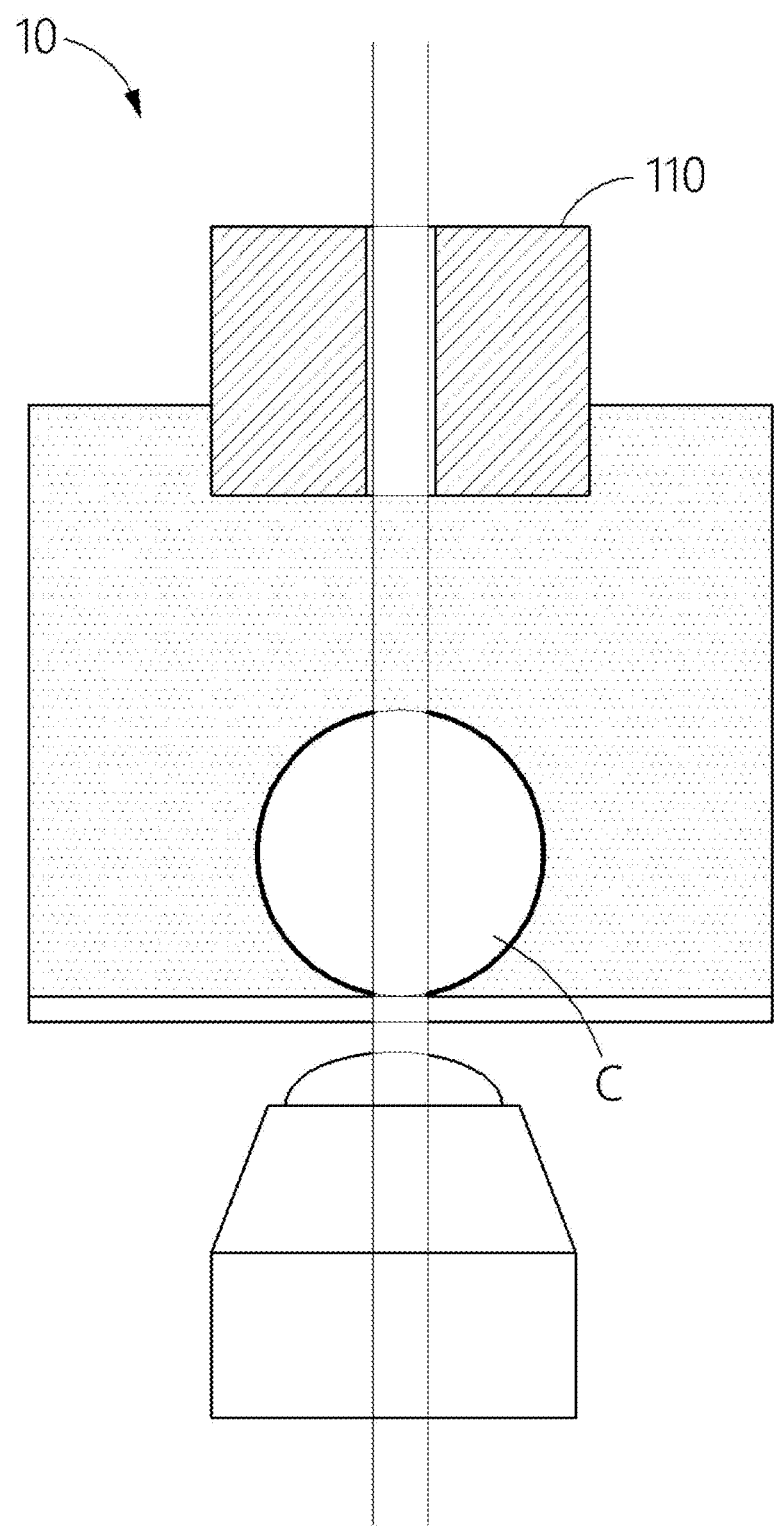
FIG. 2 is a view illustrating a sample made before ultrasonic oscillation.

FIG. 2 is a view illustrating the sample C made before the ultrasonic oscillation.

Figure 3:
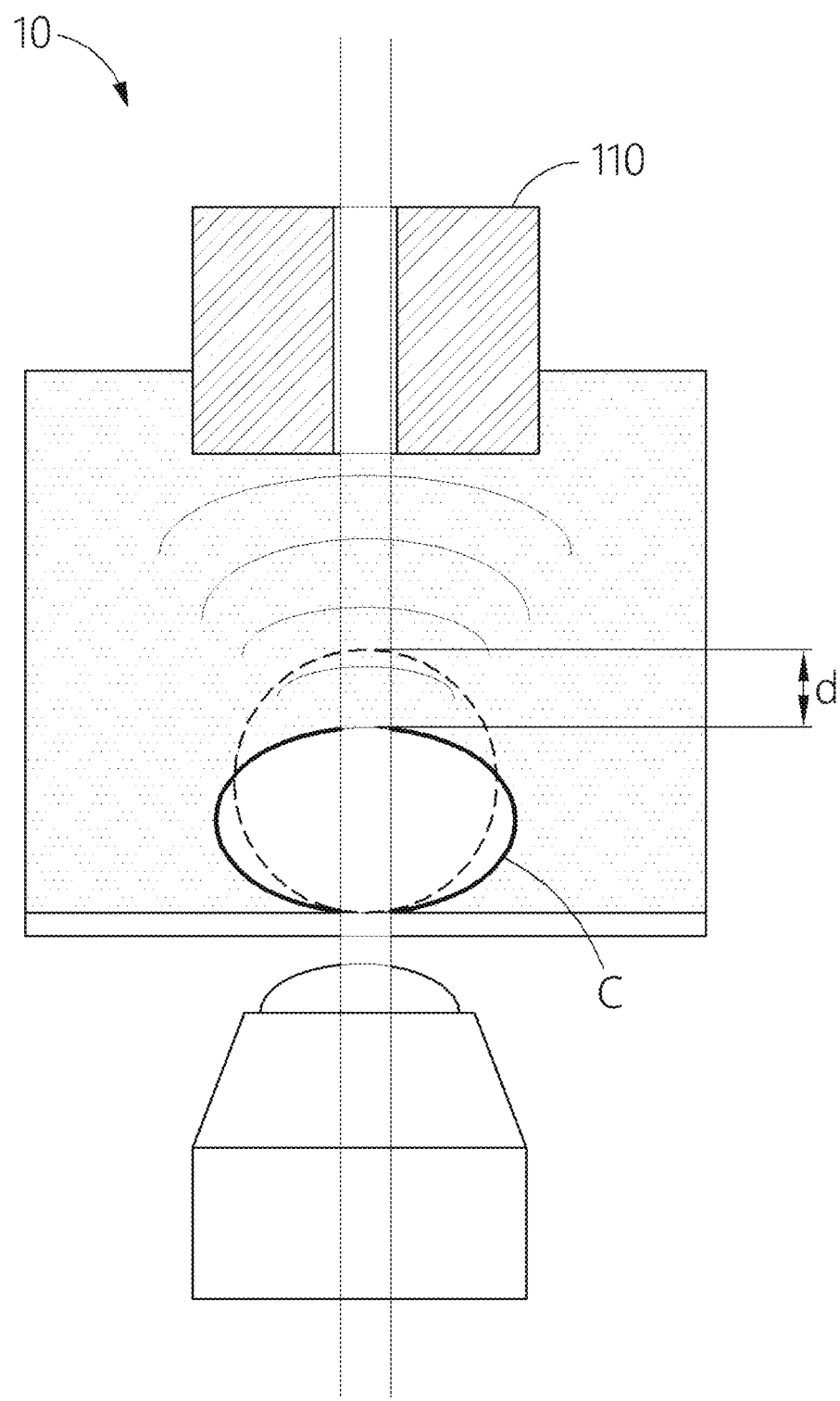
FIG. 3 is a view illustrating a sample deformed by ultrasonic oscillation.

FIG. 3 is a view illustrating the sample C deformed by the ultrasonic oscillation.

Referring to FIG. 2, the ultrasonic converter 110 formed in the ring type may ensure the propagation path for the light from the light source 210, such that the illustrated sample C may transmit the light. In contrast, the ultrasonic waves may not be applied to the sample C from the ultrasonic converter 110. Therefore, the image acquisition part 200 may acquire an image of the sample C that is not deformed in thickness.

Meanwhile, referring to FIG. 3, the illustrated sample C may transmit the light emitted from the light source 210 and be deformed by the ultrasonic waves emitted from the ultrasonic converter 110. That is, the thickness of the sample C illustrated in FIG. 3 may be decreased by d in the Z-axis direction in comparison with the sample C illustrated in FIG. 2. In this case, in addition to the deformation of the sample C in the Z-axis direction, the deformation of the sample C in the X-axis and Y-axis directions may also occur. However, the deformation rate of the sample C in the X-axis and Y-axis directions may be lower than the deformation rate in the Z-axis direction.

The image acquisition part 200 may acquire the plurality of images of the sample C before, during, and after the deformation by using the phase difference while stimulating and deforming the sample C by means of the ultrasonic waves for a predetermined period of time. In this case, the time for which the elasticity of the sample C is restored is very short, but the ultra-high-speed camera 230 of the image acquisition part 200 may acquire the X-Y plane high-resolution image of the sample C that is deformed and restored within a very short time, and the ultra-high-speed camera 230 may also precisely measure the change in thickness in the Z-axis direction.

The imaging system 10 according to the embodiment described above may perform phase difference imaging on a shape of the sample C that is deformed by physical stress caused by the ultrasonic waves.

Figure 4:
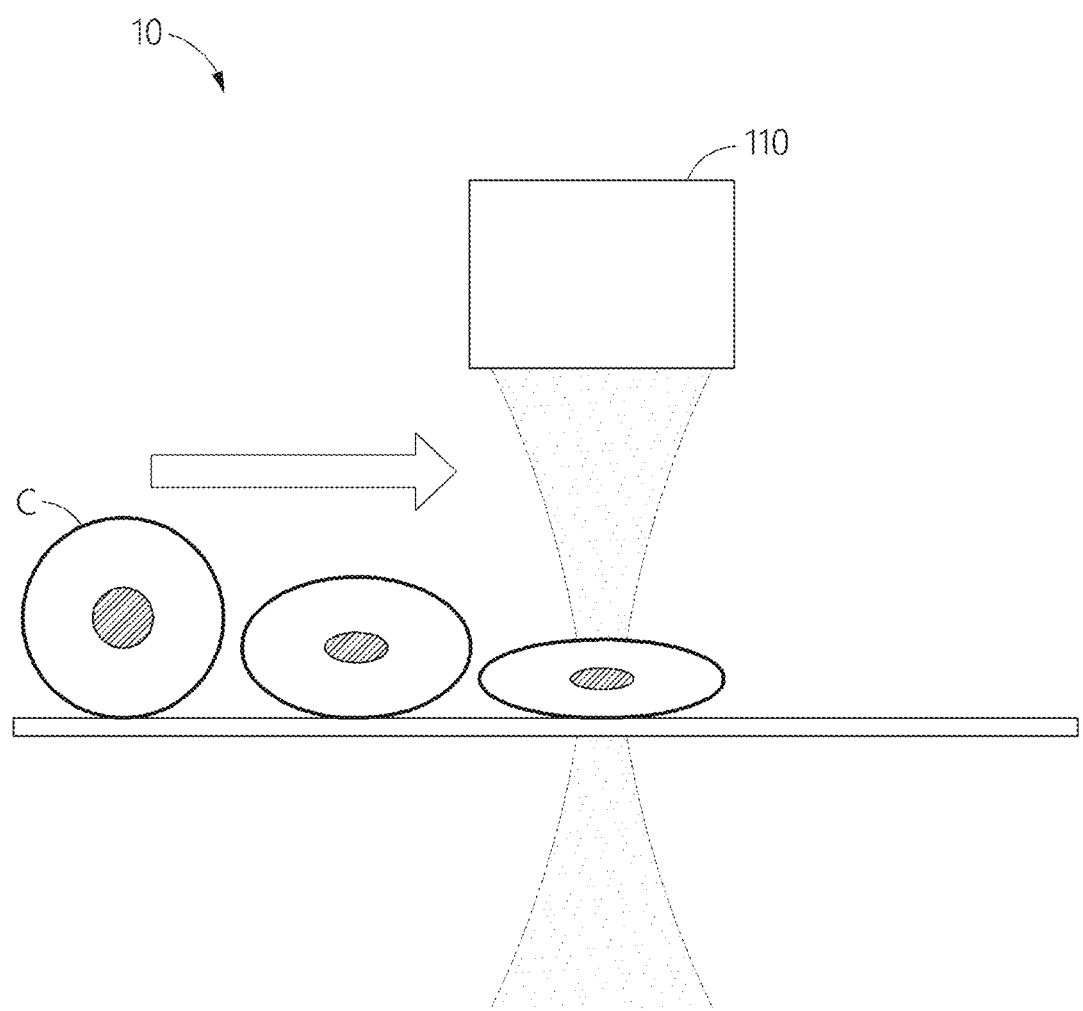
FIG. 4 is a view illustrating a state in which a sample is captured and deformed by ultrasonic oscillation.

FIG. 4 is a view illustrating a state in which the sample C is captured and deformed by the ultrasonic oscillation.

Referring to FIG. 4, the ultrasonic waves emitted from the ultrasonic converter 110 may capture a single cell freely floating in a culture medium.

Specifically, the ultrasonic converter 110 may be provided as a high-frequency converter having a high focusing degree. Therefore, when the ultrasonic converter 110 applies the ultrasonic waves to the sample C, the sample C floating in the culture medium may move toward a focal point of the ultrasonic waves as indicated by the arrow direction.

In addition, the sample C may receive pressure caused by the ultrasonic waves while being captured and fixed on the focal point by the ultrasonic waves. That is, like the sample C illustrated in FIG. 3, a deformation in thickness in the Z-axis direction may be generated by the ultrasonic waves.

As described above, the imaging system 10 according to the embodiment may capture the single cell freely floating in the culture medium without cell culture by using the high-focusing and high-frequency ultrasonic micro-beam. Therefore, it is possible to reduce the time required for the cell culture, thereby more quickly measuring the characteristics of the cell.

In addition, the ultrasonic oscillation part 100 of the imaging system 10 according to the embodiment may emit high-frequency ultrasonic micro-beams to the sample C of the single cell and emit low-frequency ultrasonic beams to the sample C including a plurality of cell groups. Therefore, it is possible to additionally measure and analyze the mechanical characteristics according to the cell grouping in addition to the mechanical characteristics of the single cell.

Figure 5:
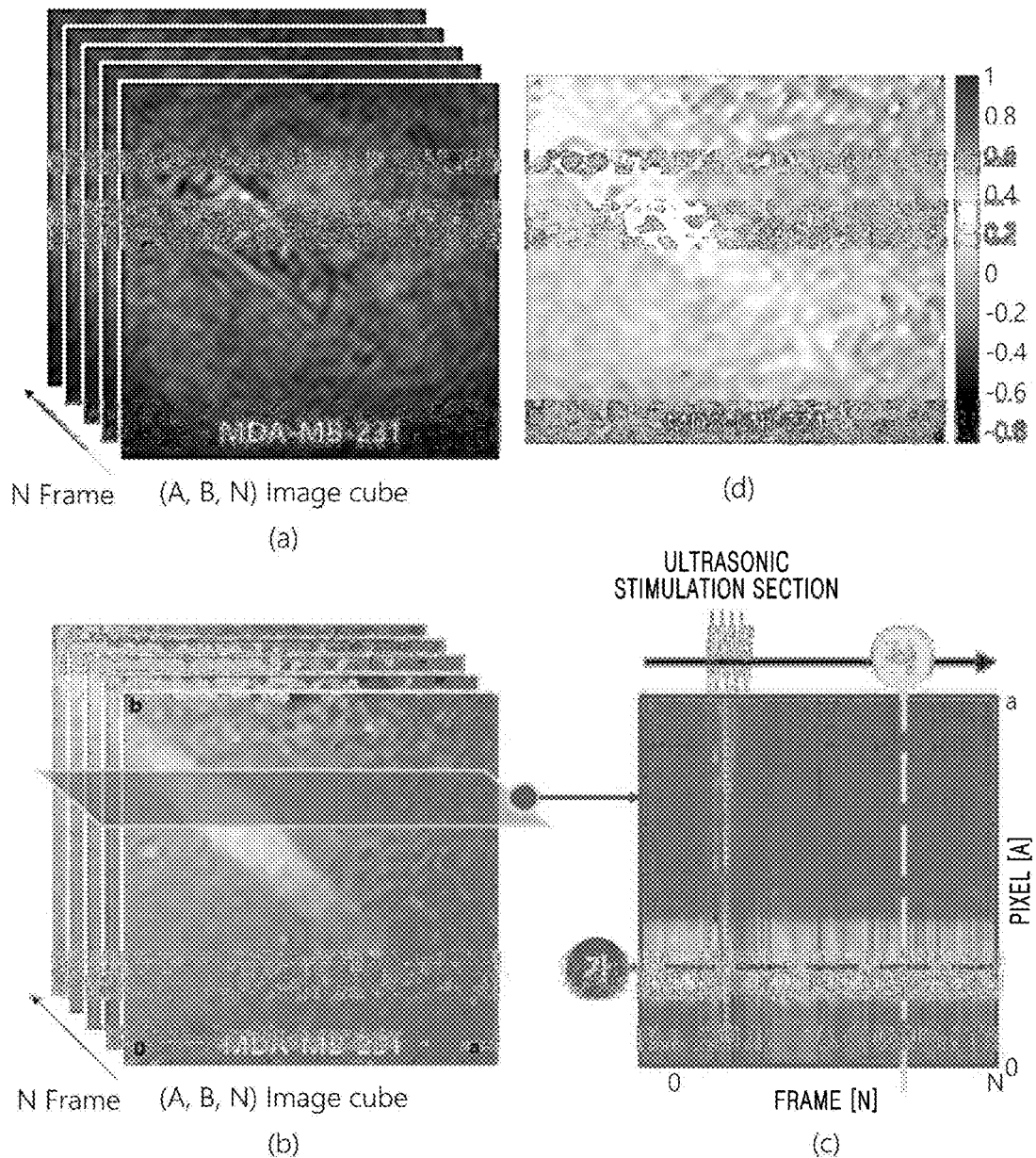
FIG. 5 is a view illustrating information on displacement of a cell acquired from an image acquired by an image acquisition part.

FIG. 5 illustrates information on the displacement of the sample C obtained from the image acquired by the image acquisition part 200.

FIG. 5A illustrates an image of the sample C on the X-Y plane acquired by the image acquisition part 200. In this case, the image acquisition part 200 may acquire the plurality of phase difference images for a predetermined period of time.

FIG. 5B illustrates a thickness map created from the plurality of phase difference images.

Specifically, the computation part 300 may create the thickness map by mapping the thickness for each pixel in respect to one cell from the plurality of phase difference images.

That is, FIG. 5B illustrates the plurality of thickness mapping images made before, during, and after the application of the ultrasonic waves to the sample C.

In addition, the image acquisition part 200 and the computation part 300 may map the thickness of the local site, which makes it possible to accurately map thickness of small organs, such as nucleuses or mitochondria, included in the cells and having different mechanical characteristics.

FIG. 5D illustrates a normalized distortion rate of the sample C.

Specifically, the computation part 300 may create a graph related to the normalized distortion rate from the thickness map images. The graph may be expressed in various colors according to a reference surface, i.e., a displacement of the sample C from an initial position. Referring to FIG. 5D, a portion colored in yellow may be a portion in which a large displacement is made by the ultrasonic stimulation in comparison with a portion colored in blue.

Figure 6:
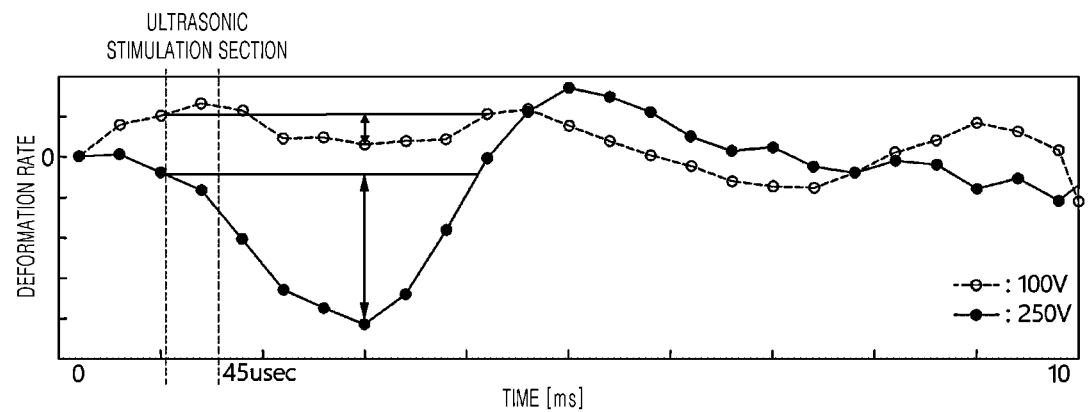
FIG. 6 is a graph illustrating a deformation rate of a cell over time.

FIG. 6 is a graph illustrating a deformation rate of the sample C over time.

The computation part 300 may compute the deformation rates made before, during, and after the application of the ultrasonic waves to the sample C on the basis of the displacement measured from the plurality of phase difference images acquired by the image acquisition part 200.

Referring to FIG. 6, it can be seen that when a voltage of the ultrasonic wave is 250 V, the deformation rate made before the ultrasonic stimulation is 0, and the deformation rate is decreased to 0 or less in an ultrasonic stimulation section and for a predetermined period of time after the stimulation. That is, it can be seen that the thickness of the sample C is decreased by the ultrasonic stimulation.

However, it can be seen that after a further amount of time elapses, the deformation rate is increased to 0 or more and then converged into 0. That is, it can be seen that the thickness of the sample C is greatly decreased by the ultrasonic stimulation, and then the thickness of the sample C is increased to an original thickness or more by elasticity while being restored to the original thickness, such that the sample C is restored to an original size.

Figure 7:
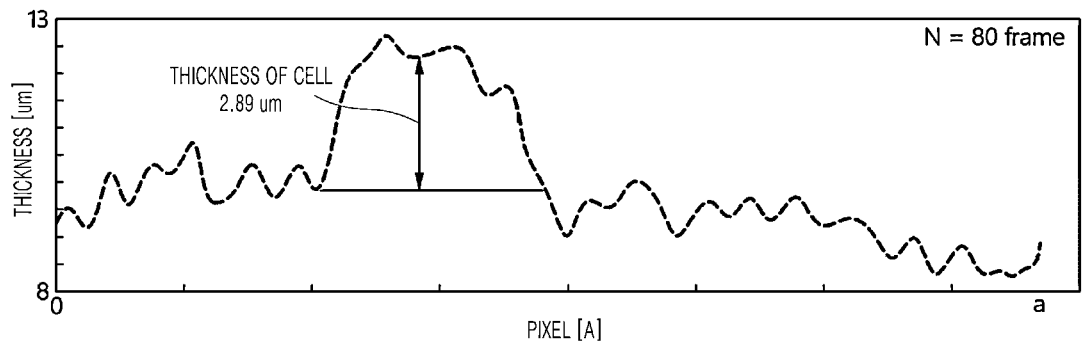
FIG. 7 is a graph illustrating a change in thickness of a cell with respect to a pixel.

FIG. 7 is a graph illustrating a change in thickness of a cell with respect to a pixel.

Referring to FIG. 7, it can be seen that the thickness of the sample C is greatly increased in a particular pixel and then restored to the original thickness.

As a result, on the basis of the deformation rate of the sample C that varies as illustrated in FIGS. 6 and 7, the computation part 300 may compute the elastic modulus, and thus determine the metastasis.

Figure 8:
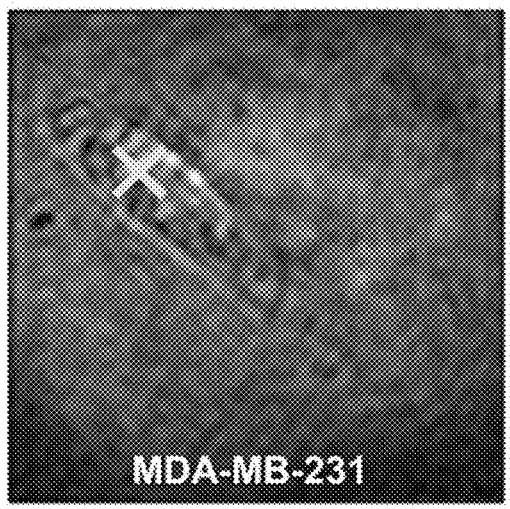
FIG. 8 is a view illustrating phase difference image and distortion of two cells different in metastasis.
Figure 8:
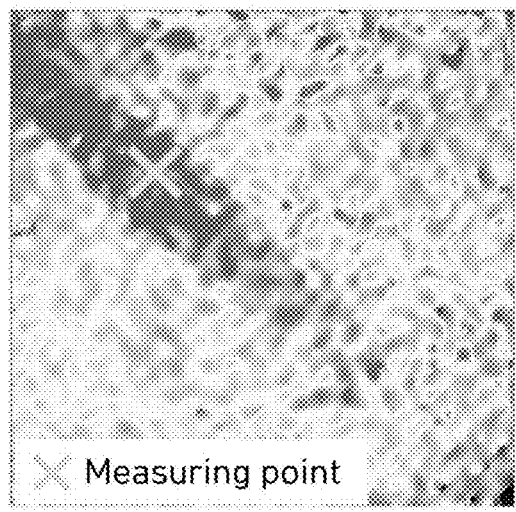
Figure 8:
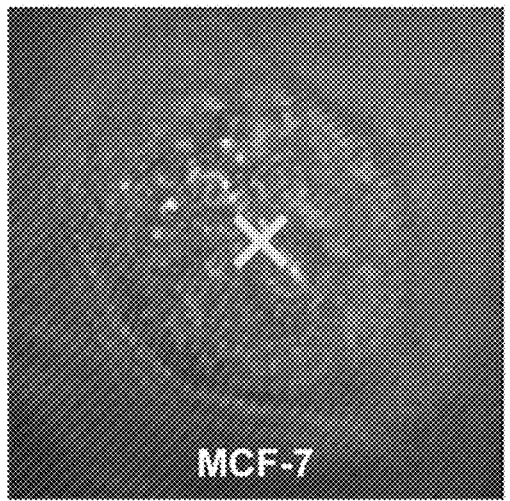
Figure 8:
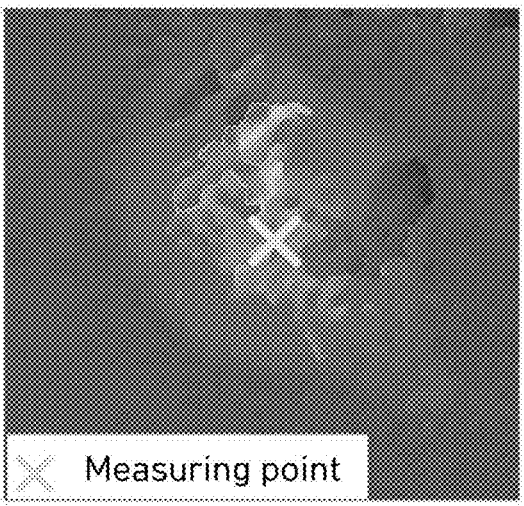

FIG. 8 illustrates information on displacement of two cells different in metastasis.

In this case, the two cells are cells respectively named MDA-MB-231 and MCF-7. The MDA-MB-231 is a cell having high metastasis, and MCF-7 is a cell having low metastasis.

Referring to FIG. 8, the left images illustrate phase difference images of a first sample (MDA-MB-231) and a second sample (MCF-7). The right images illustrate normalized distortion maps of the first and second samples. In addition, the X points indicated in the respective images may be focal points of the ultrasonic waves.

It can be seen that the comparison between the distortion maps of the first and second samples indicating that a periphery of the first sample is colored in blue, whereas the cell portion includes portions indicated by yellow light and red light. That is, it can be seen that the first sample has a large displacement caused by the ultrasonic waves.

In contrast, it can be seen, from the distortion map, that the second sample uses a bottom surface indicated in blue as an origin, and there is not a great difference between the color of the cell portion and the color of the portion at the periphery of the cell. That is, it can be seen that the second sample has a small displacement caused by the ultrasonic waves.

Figure 9:
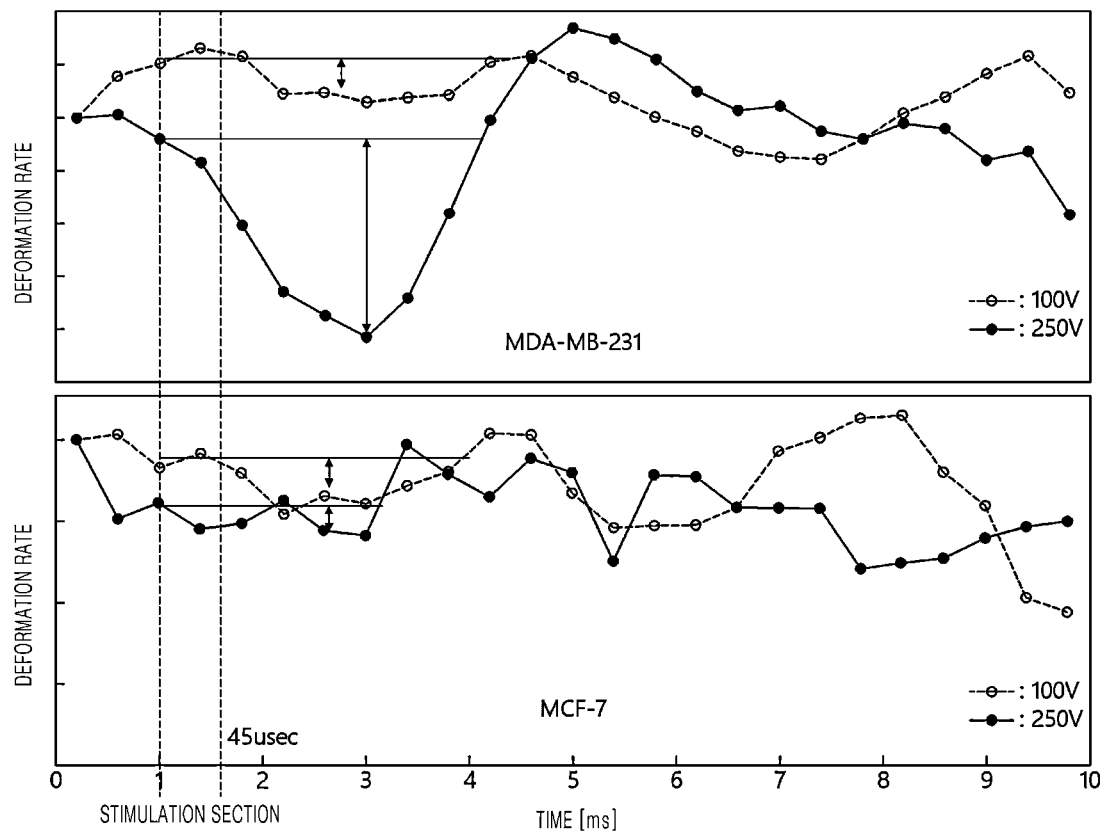
FIG. 9 is a graph illustrating deformation rates over time of two cells different in metastasis.

FIG. 9 is a graph illustrating deformation rates over time of two cells different in metastasis.

Referring to FIG. 9, it can be seen that when the voltage of the ultrasonic stimulation is 100 V, the deformation rate of the first sample is almost not changed from 0. However, it can be seen that when the voltage of the ultrasonic stimulation is 250 V, the deformation rate of the first sample is greatly changed.

In contrast, it can be seen that there is no difference in deformation rate of the second sample in the cases in which the voltage of the ultrasonic stimulation is 100 V and 250 V. In addition, it can be seen that in comparison with the graph of the first sample that receives the ultrasonic stimulation of 250 V, the deformation rate of the first sample is greatly changed, but the second sample is almost not deformed even by the ultrasonic stimulation with the same intensity.

According to the result illustrated in FIGS. 8 and 9, it can be seen that the imaging system 10 according to the embodiment may be used to measure the deformation rates of the cells and determine the metastasis.

That is, the cell having high metastasis is high in deformation rate caused by the ultrasonic stimulation, but the cell having low metastasis is low in deformation rate caused by the ultrasonic stimulation, and this means that the cell having low metastasis has high rigidity. In addition, it can be seen that in the case of the cell having high rigidity, there is no great difference in change in thickness caused by the ultrasonic stimulation even though the voltage is increased.

As described above, the imaging system 10 according to the embodiment may precisely measure the mechanical characteristics of the sample C by using the ultrasonic radiation and optical phase imaging.

In addition, the imaging system 10 according to the embodiment stimulates the sample C by using the ultrasonic waves, which makes it possible to perform the non-invasive and non-destructive measurement without coming into direct contact with the sample C.

In addition, because the cell culture is not required, it is possible to reduce the time required to measure the characteristics of the cell in comparison with a technology in the related art in which laborious processes and time are required to perform the cell culture.

In addition, the imaging system 10 according to the embodiment may use the phase difference microscope to acquire the high-resolution X-Y plane phase difference images of the sample C and acquire information on the displacement in the Z-axis direction.

As a result, the imaging system 10 according to the embodiment may be used to compute the elastic modulus by measuring the displacement of the sample C, which makes it possible to compare the mechanical characteristics of the different samples C and determine the metastasis of the cancer cell on the basis of the comparison result.

A method of controlling the imaging system will be described with reference to FIG. 10.

The light source 210 may emit light in one direction toward a polarizing separator, and the emitted light may be a laser beam (S110).

The polarizing separator may separate the emitted laser beams into first and second beams having different optical paths (S120).

The first beam is the object wave for illuminating the sample, and the second beam may be the reference wave.

The second beam may selectively pass through a beam expander 220 before the second beam enters a second mirror after passing through the polarizing separator.

The first beam separated from the polarizing separator may enter a first mirror, the first mirror may illuminate the sample on the path for the first beam, the first beam passing through the sample may enter the objective lens, and the objective lens may change a direction in which the first beam enters the beam collector (S130). The second beam may enter the second mirror, and the second mirror may change a path for the second beam to a direction in which the second beam enters the beam collector (S140).

The object wave of the first beam passing through the sample may create the object wave front by illuminating the sample. The objective lens enlarges the object wave front, and the object and reference wave fronts may create coupled light by being coupled by the beam collector at the outlet of the interferometer (S150).

The ultrasonic converter may generate the ultrasonic waves in the direction of the path for the first beam directed toward the sample (S160).

In the embodiment, the first beam having the optical path changed by the first mirror may pass through the inside of the ring of the ultrasonic converter configured in the ring shape and illuminate the sample. That is, the shape of the ultrasonic converter may be configured so as not to hinder the path for the first beam that illuminates the sample.

The processor may control the camera to create an image on the basis of the coupled light (S170), and the image may be a digital hologram (phase difference image).

The created hologram may be transmitted to a separate external device or the computation part 300 for controlling the phase difference microscope. On the basis of the plurality of holograms, the phase difference microscope or the computation part 300 may compute the deformation rate according to the change in thickness of the sample or compute the elastic modulus of the sample.

The processor may control the camera to acquire the image of the sample before and during the generation of the ultrasonic waves by the ultrasonic converter.

In the embodiment, after the ultrasonic converter generates the ultrasonic waves and the image of the sample is acquired, the processor may stop the generation of the ultrasonic waves by controlling the ultrasonic converter and control the camera to acquire the image of the sample again.

While the embodiments have been described above with reference to the limited drawings, the embodiments may be variously and technologically modified and altered from the disclosure by those skilled in the art to which the embodiments pertain. For example, appropriate results may be achieved even though the described technologies are performed in different orders from the described method, the described constituent elements such as the systems, the structures, the apparatuses, and the circuits are coupled or combined in different manners from the described method, and/or the constituent elements are substituted with or replaced by other constituent elements or equivalents.

Accordingly, other implements, other exemplary embodiments, and equivalents to the appended claims are also included in the scope of the appended claims.

What is claimed is:

1. An imaging system comprising:
   an ultrasonic oscillation part configured to apply ultrasonic waves to a sample;
   an image acquisition part configured to acquire a plurality of images of the sample deformed by the ultrasonic waves; and
   a computation part configured to compute a deformation rate on the basis of a change in thickness of the sample from the plurality of images,
   wherein the computation part computes an elastic modulus of the sample on the basis of intensity of the ultrasonic waves and the deformation rate of the sample.

2. The imaging system of claim 1, wherein the ultrasonic oscillation part comprises:
   an ultrasonic converter configured to convert an electrical signal into the ultrasonic waves;
   a function generator configured to apply an electrical signal to the ultrasonic converter;
   an electric power amplifier configured to amplify a low-voltage signal to a high-voltage signal; and
   a three-axis motorized stage configured to finely adjust a position of the ultrasonic converter and a position of the electric power amplifier, and
   wherein the ultrasonic converter applies the ultrasonic waves to the sample in an axial direction identical to a direction of a light source of the image acquisition part.

3. The imaging system of claim 2, wherein the ultrasonic converter is formed in a ring type to ensure a propagation path of the light source.

4. The imaging system of claim 2, wherein intensity of the ultrasonic waves emitted from the ultrasonic converter is controlled by the electric power amplifier.

5. The imaging system of claim 2, wherein the ultrasonic converter is a high-frequency converter, and
   wherein when the ultrasonic converter applies the ultrasonic waves to the sample, the sample floating in a culture medium is moved toward a focal point of the ultrasonic waves.

6. The imaging system of claim 1, wherein the ultrasonic oscillation part emits high-frequency ultrasonic microbeams to a single sample and emits low-frequency ultrasonic beams to a plurality of samples to measure mechanical characteristics of the sample.

7. The imaging system of claim 1, wherein the image acquisition part comprises:
   a light source configured to emit light to the sample;
   a phase difference microscope configured to create a phase difference image of the sample; and
   a camera configured to acquire a plurality of phase difference images by capturing images of the sample that is deformed by the ultrasonic waves and restored again.

8. The imaging system of claim 7, wherein the camera is an ultra-high-speed camera configured to acquire the image of the sample at a speed of 1000 fps or more.

9. The imaging system of claim 7, wherein the computation part measures a thickness displacement of the sample by analyzing the plurality of phase difference images for each pixel and computes the deformation rate of the sample.

10. The imaging system of claim 8, wherein the computation part computes the elastic modulus of the sample on the basis of the intensity of the ultrasonic waves and the deformation rate.

11. An imaging system comprising:
    a light source configured to generate laser beams;
    a polarizing separator configured to separate the laser beams into a first beam and a second beam;
    a first mirror configured to change an optical path for the first beam to a direction of a sample;
    a second mirror configured to change an optical path for the second beam;
    a beam collector configured to create coupled light by coupling the first beam having the optical path changed by the first mirror and the second beam having the optical path changed by the second mirror;
    an ultrasonic converter configured to generate ultrasonic waves in a direction of the first beam having the optical path changed by the first mirror on the basis of an electrical signal;
    a camera configured to acquire an image of the sample on the basis of the coupled light; and
    a processor configured to control the camera to acquire a plurality of images of the sample before and after the generation of the ultrasonic waves by the ultrasonic converter.

12. The imaging system of claim 11, wherein the processor is further configured to control the ultrasonic converter to stop the generation of the ultrasonic waves after the generation of the ultrasonic waves by the ultrasonic converter, and the processor is further configured to control the camera to additionally acquire an image of the sample after the generation of the ultrasonic waves is stopped.

13. The imaging system of claim 11, wherein the ultrasonic converter is configured in a ring shape, and the first beam having the optical path changed by the first mirror enters the beam collector through the interior of the ring.

14. A method of controlling an imaging system, the method comprising:
    generating, by a processor, laser beams by controlling a light source;
    separating, by a polarizing separator, the laser beams into a first beam and a second beam;
    changing, by a first mirror, an optical path for the first beam to a direction of a sample;
    changing, by a second mirror, an optical path for the second beam;

creating, by a beam collector, coupled light by coupling the first beam having the optical path changed by the first mirror and the second beam having the optical path changed by the second mirror;

generating, by an ultrasonic converter, ultrasonic waves in a direction of the first beam having the optical path changed by the first mirror on the basis of an electrical signal; and acquiring, by the processor, an image of the sample from the coupled light by controlling a camera, wherein the processor is configured to control the camera to acquire a plurality of images of the sample before and after the generation of the ultrasonic waves by the ultrasonic converter.

15. The method of claim 14, further comprising:

controlling, by the processor, the ultrasonic converter to stop the generation of the ultrasonic waves after the generation of the ultrasonic waves by the ultrasonic converter, and additionally acquiring an image of the sample by controlling the camera after the generation of the ultrasonic waves is stopped.

\* \* \* \* \*